(No Model.) 9 Sheets—Sheet 1.

F. F. RAYMOND, 2d.
HEEL NAILING MACHINE.

No. 410,195. Patented Sept. 3, 1889.

Witnesses.
J. M. Dolan
Fred. B. Dolan

Inventor.
F. F. Raymond 2d (No Model.)　　　　F. F. RAYMOND, 2d.　　　9 Sheets—Sheet 2.
HEEL NAILING MACHINE.
No. 410,195.　　　　　　　　Patented Sept. 3, 1889.
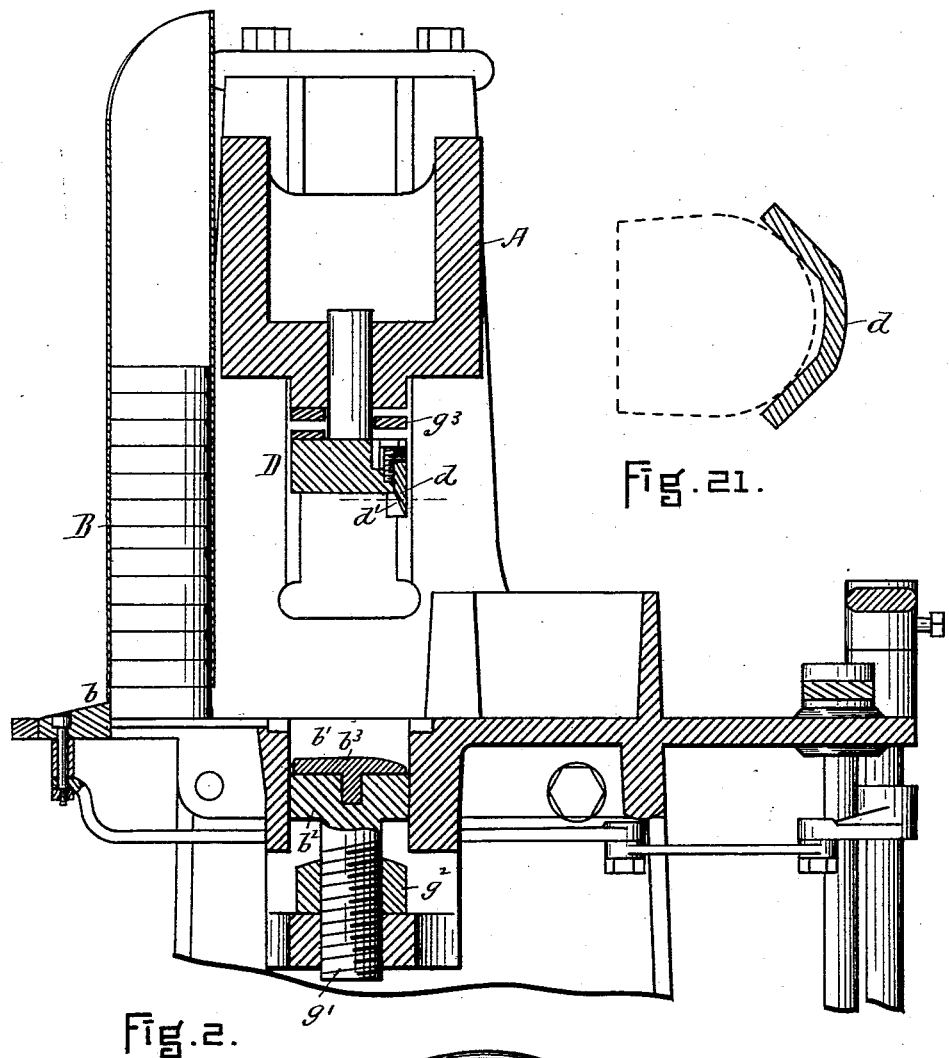
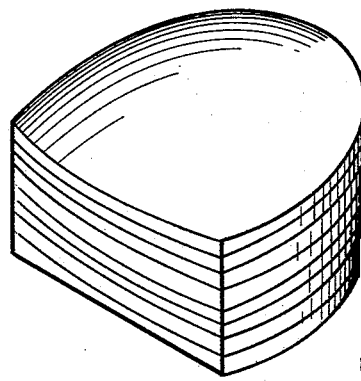
WITNESSES.　　　　　　　　　　　INVENTOR.

(No Model.) 9 Sheets—Sheet 4.

F. F. RAYMOND, 2d.
HEEL NAILING MACHINE.

No. 410,195. Patented Sept. 3, 1889.

Figure 4:
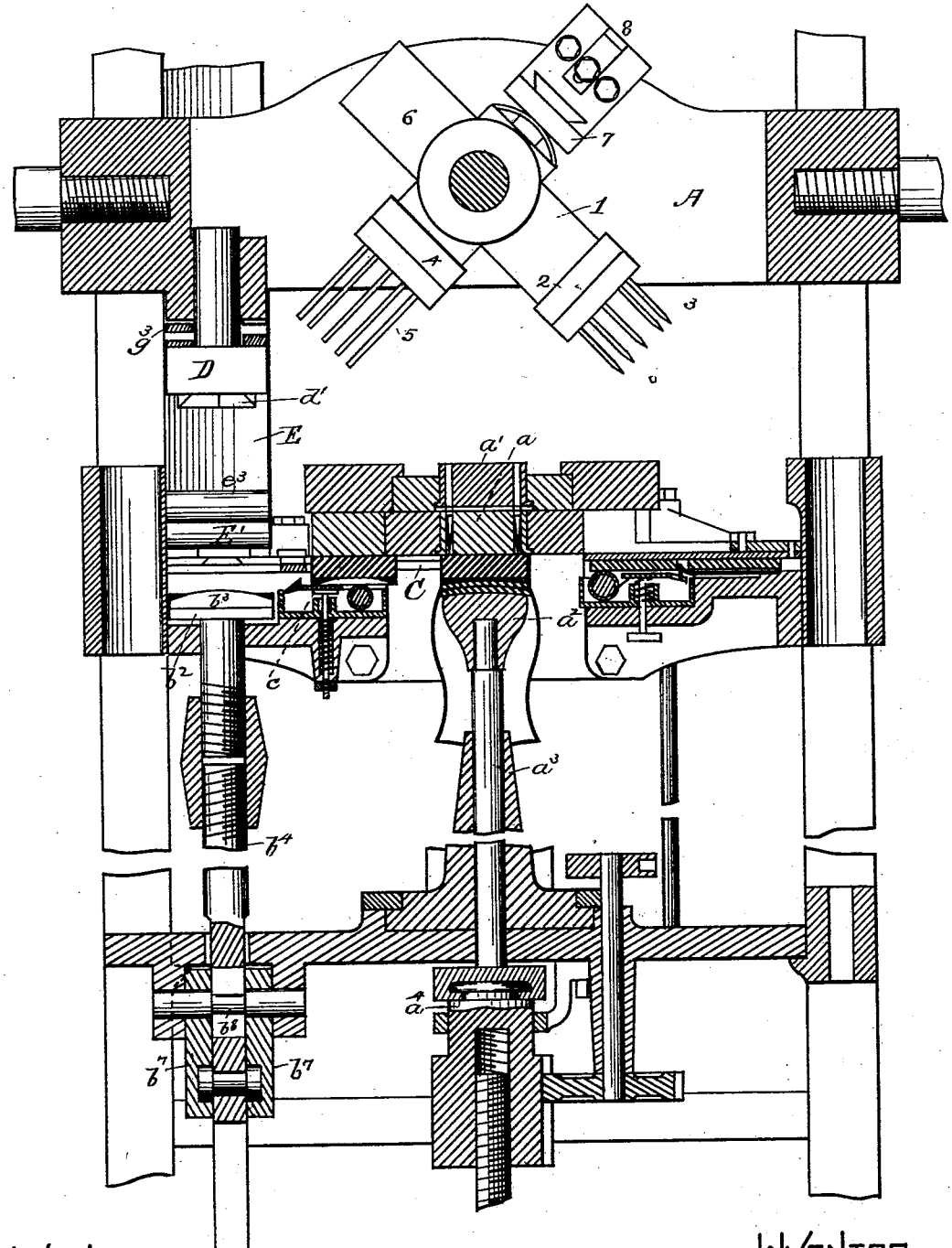

WITNESSES. Fig. 4. INVENTOR.

(No Model.)  9 Sheets—Sheet 6.
F. F. RAYMOND, 2d.
HEEL NAILING MACHINE.
No. 410,195.  Patented Sept. 3, 1889.
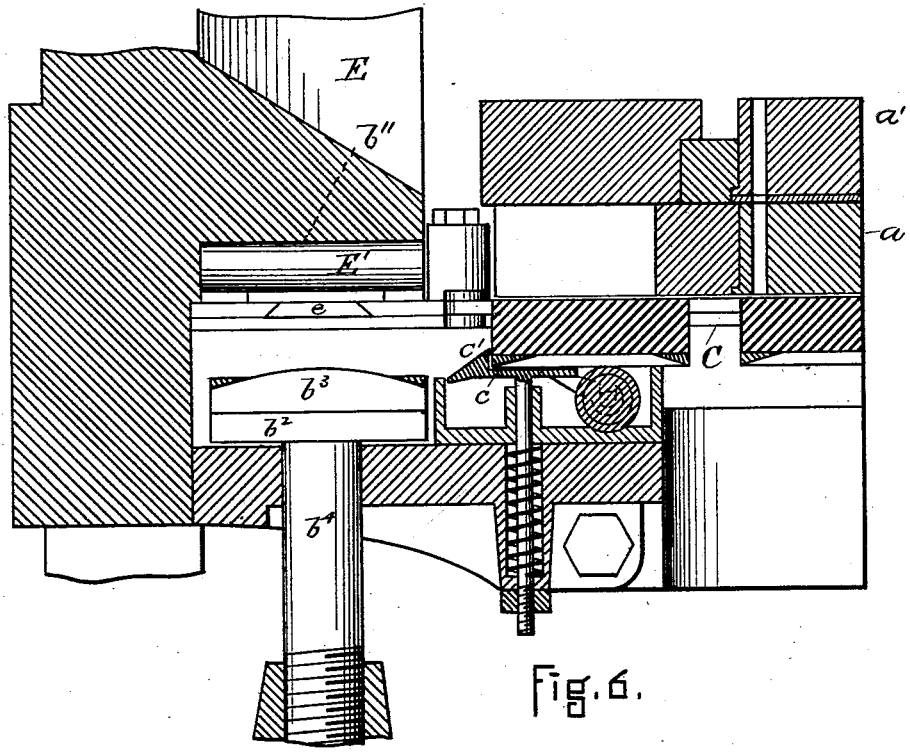
Fig. 6.
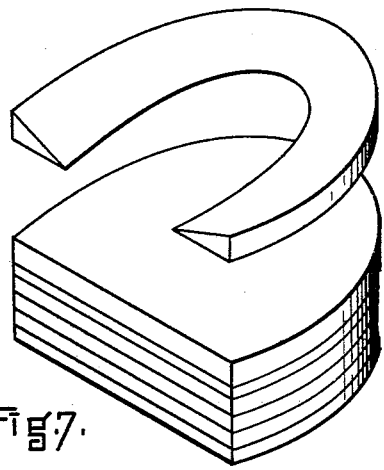
Fig. 7.
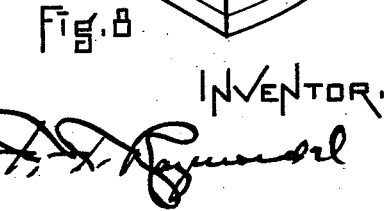
Fig. 8.
WITNESSES.
J. M. Dolan.
Fred. B. Dolan.
INVENTOR.

(No Model.) 9 Sheets—Sheet 7.

F. F. RAYMOND, 2d.
HEEL NAILING MACHINE.

No. 410,195. Patented Sept. 3, 1889.

WITNESSES.
J. M. Dolan.
Fred. B. Dolan.

INVENTOR.
F. F. Raymond (No Model.)  9 Sheets—Sheet 8.

F. F. RAYMOND, 2d.
HEEL NAILING MACHINE.

No. 410,195.  Patented Sept. 3, 1889.

Witnesses.  Inventor.

(No Model.) 9 Sheets—Sheet 9.

F. F. RAYMOND, 2d.
HEEL NAILING MACHINE.

No. 410,195. Patented Sept. 3, 1889.

WITNESSES.
J. M. Dolan.
Fred. B. Dolan.

INVENTOR.
F. F. Raymond 2d

UNITED STATES PATENT OFFICE.

FREEBORN F. RAYMOND, 2D, OF NEWTON, MASSACHUSETTS.

HEEL-NAILING MACHINE.

SPECIFICATION forming part of Letters Patent No. 410,195, dated September 3, 1889.

Application filed April 16, 1887. Serial No. 234,987. (No model.)

*To all whom it may concern:*

Be it known that I, FREEBORN F. RAYMOND, 2d, of Newton, in the county of Middlesex and State of Massachusetts, a citizen of the United States, have invented a new and useful Improvement in Heel-Nailing Machines, of which the following is a full, clear, and exact description, reference being had to the accompanying drawings, forming a part of this specification, in explaining its nature.

The invention comprises a heel-nailing machine having a device or mechanism for forming a cavity or seat in the heel-blank immediately before it is attached; also, to a heel-nailing machine having a rand-feeding device; also, to a machine having a rand and heel-blank feeding device.

The invention also comprises means for forming a recess or cavity in the heel-seat of a heel-blank while it is being fed to the attaching devices, to means for feeding rands automatically to a position to be united with or to the heel-blanks as they are fed to the attaching devices, and for so uniting them.

It further comprises various details of organization and construction.

The invention is illustrated as applied to the machines described in my application for patent for improvement in heel-nailing machines, Serial No. 234,985, executed of even date herewith.

Figure 1:
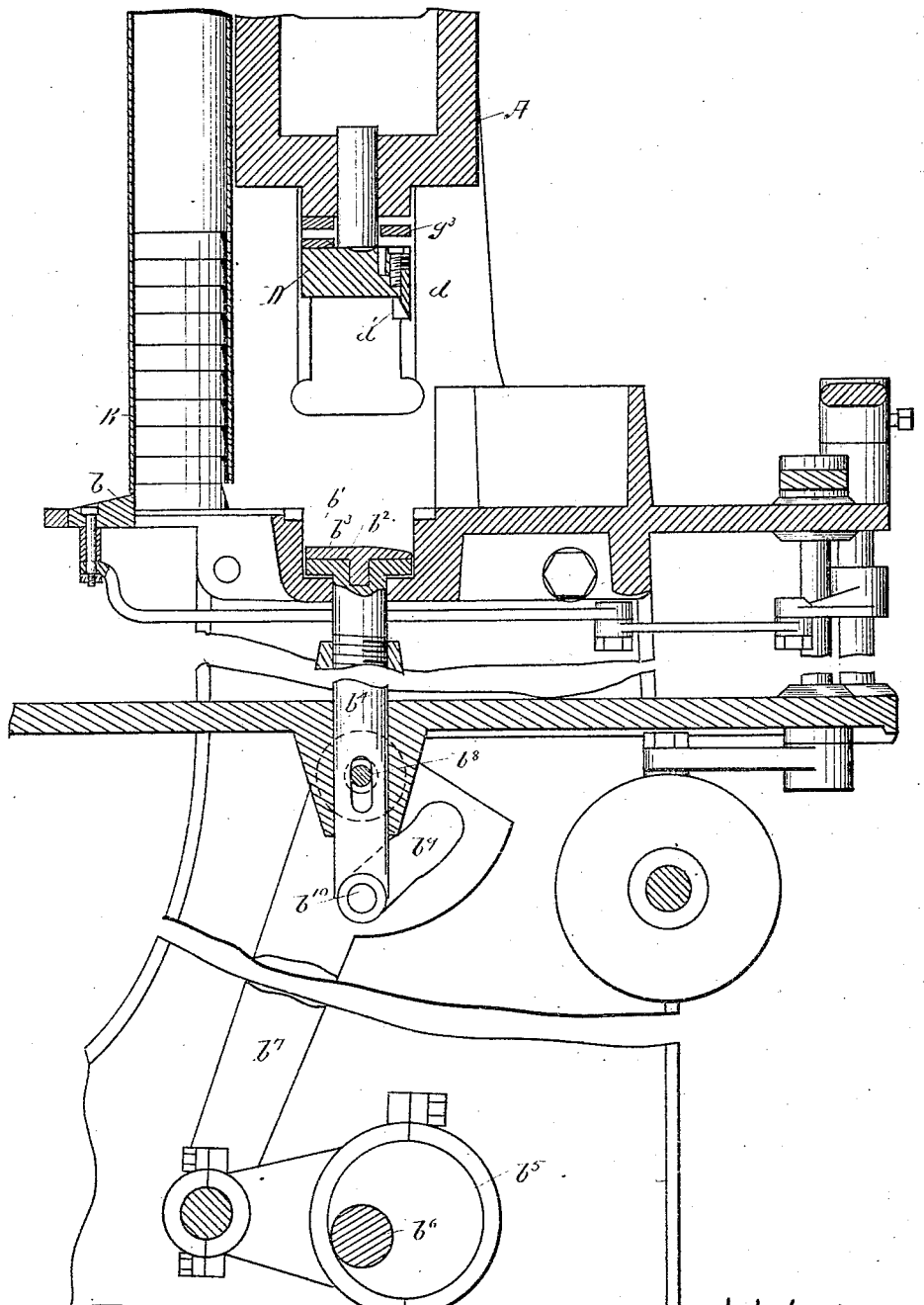
Figure 3:
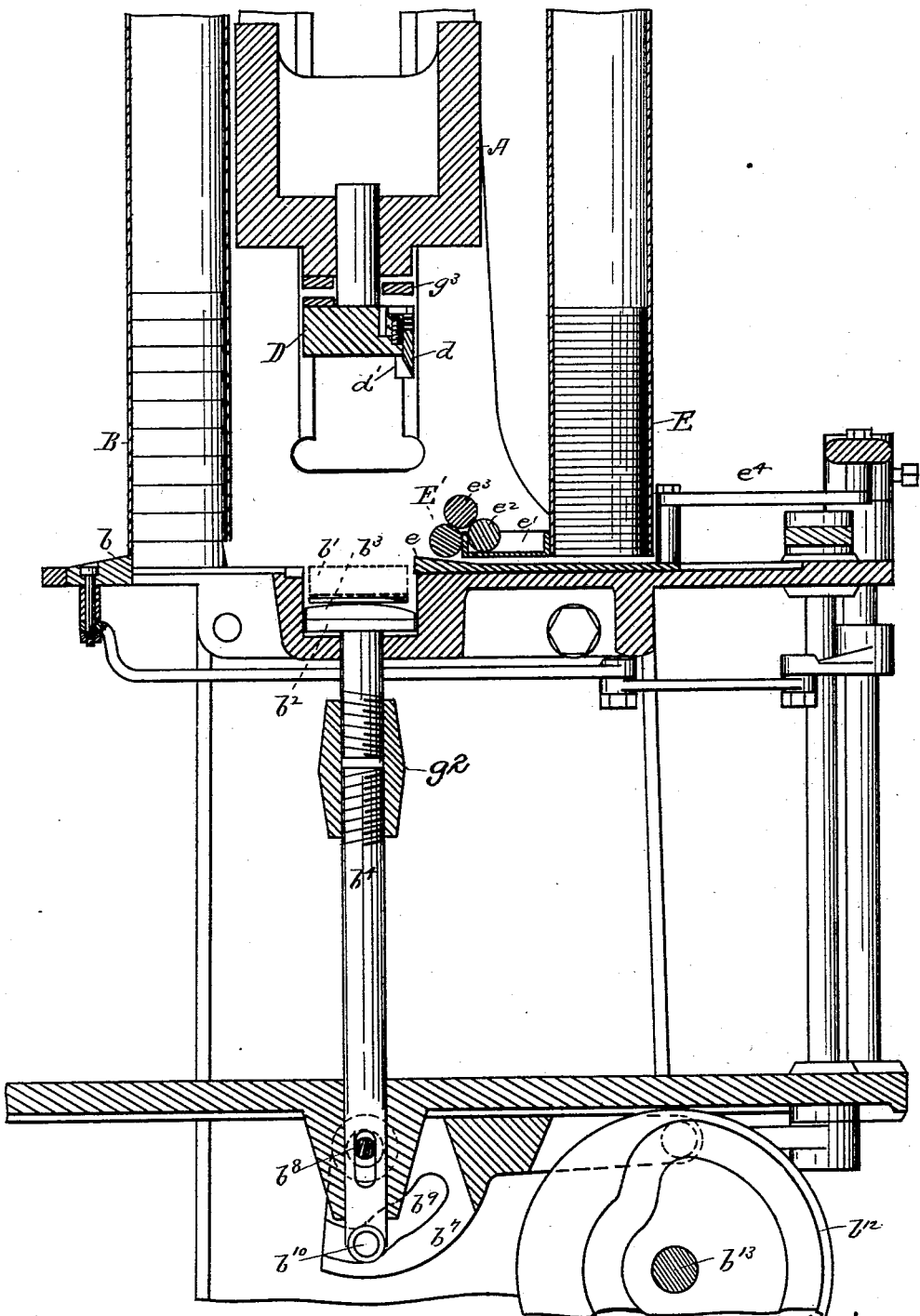
Figure 5:
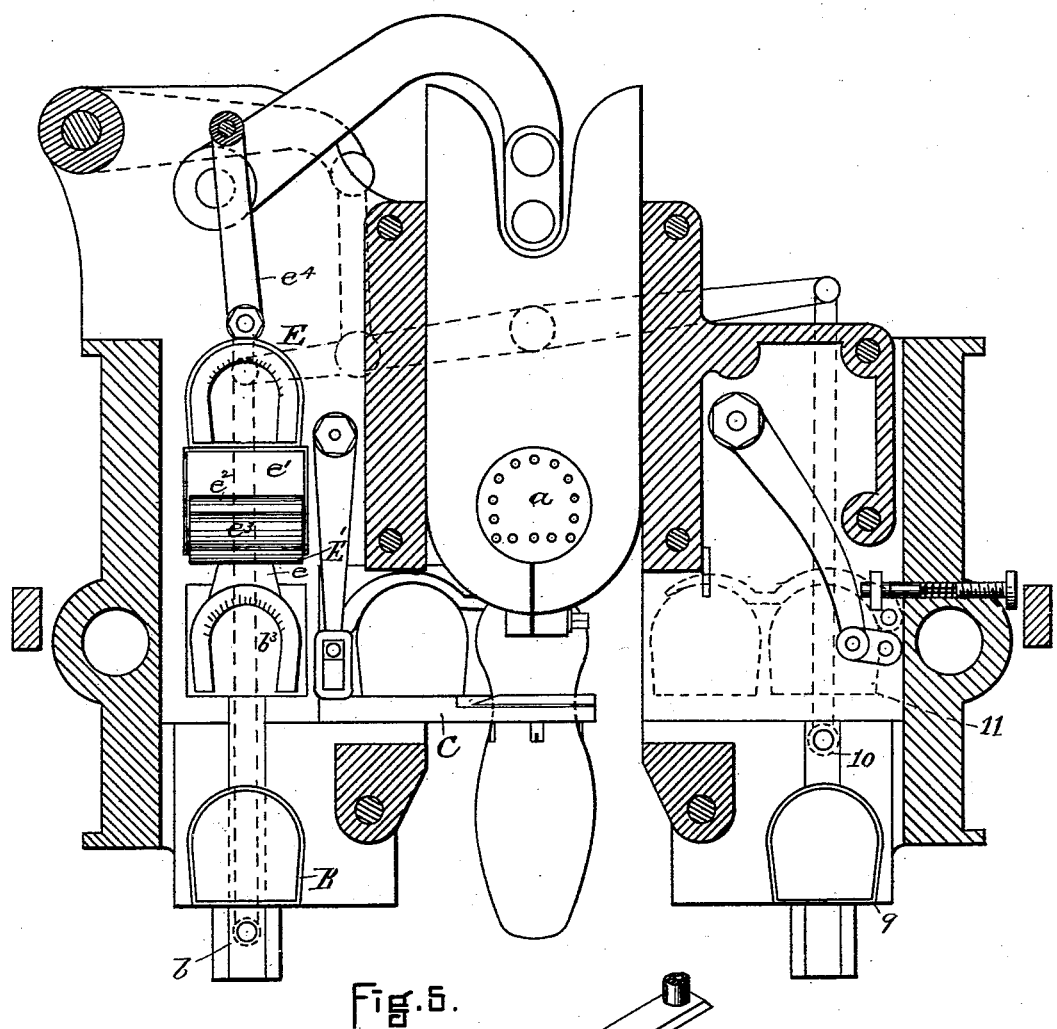
Figure 20:
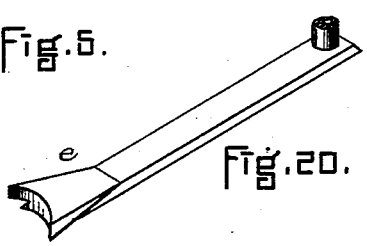
Figure 9:
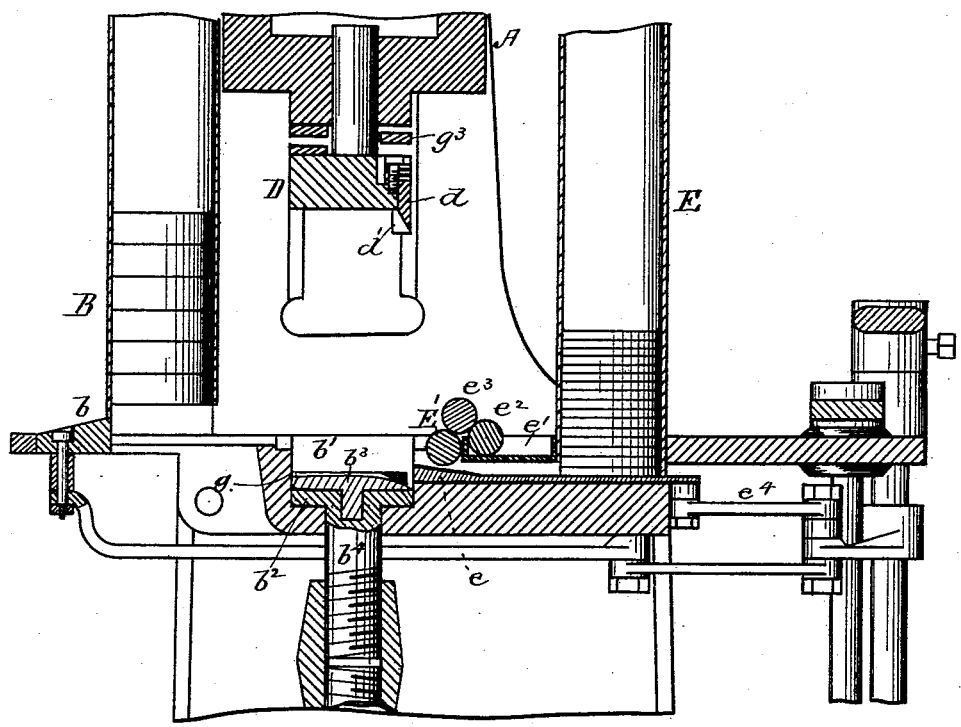
Figure 10:
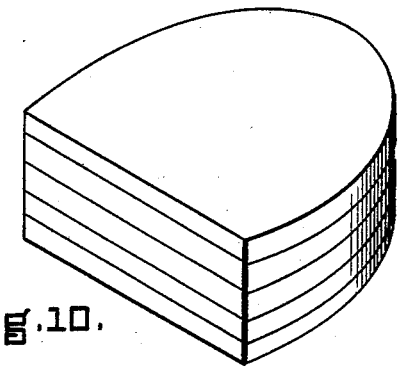
Figure 11:
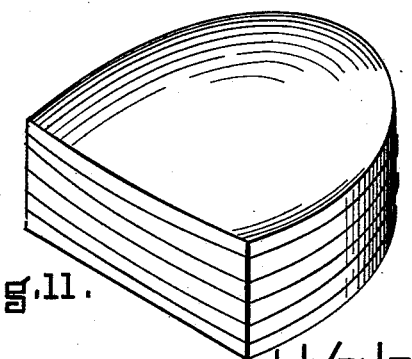
Figure 13:
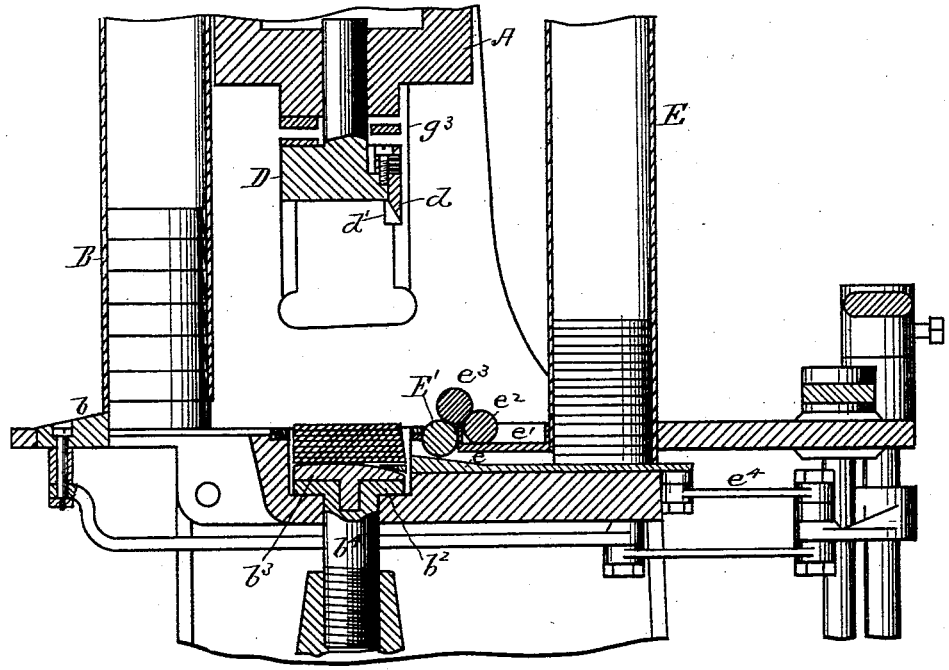
Figure 14:
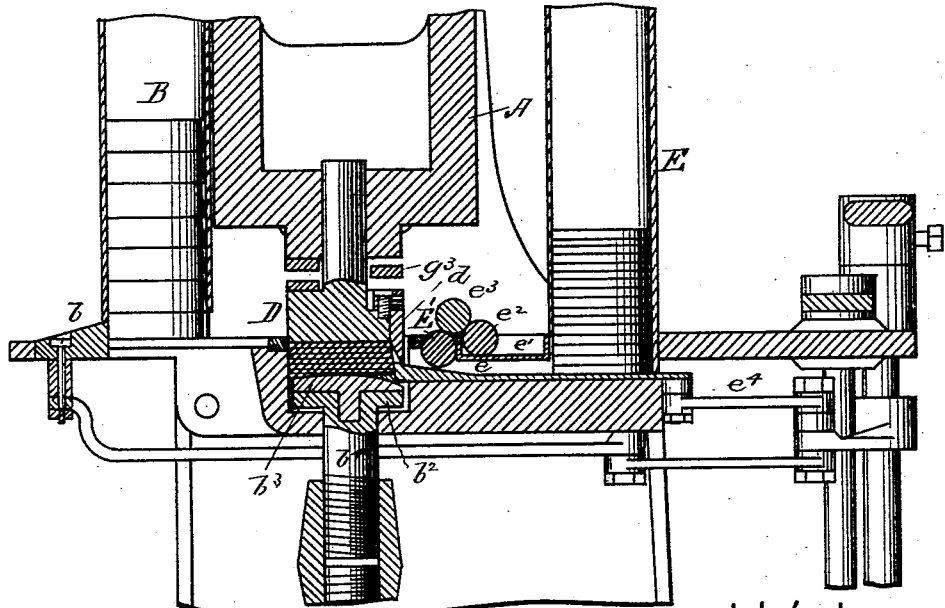
Figure 15:
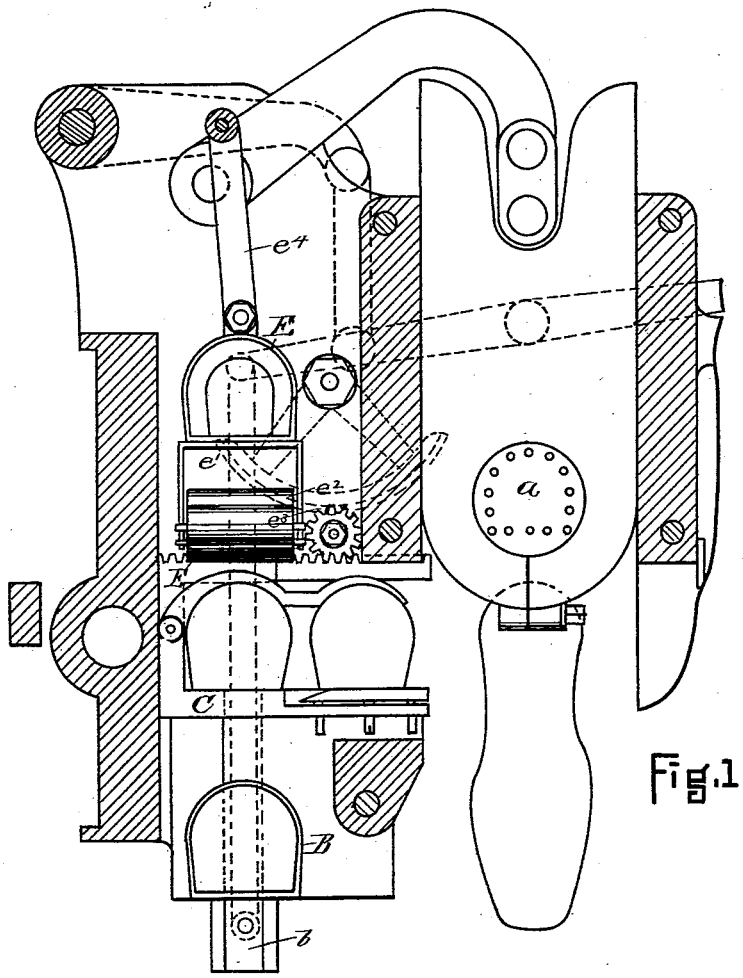
Figure 16:
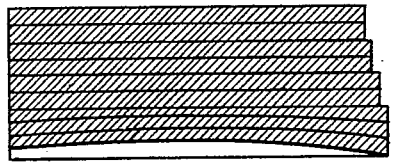
Figure 17:
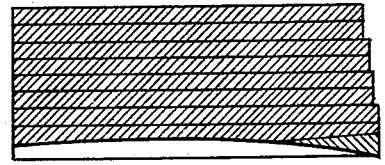
Figures 18, 19:
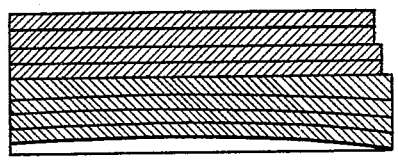

In the drawings, Figure 1 is a view in elevation and section of so much of said machine as is necessary to illustrate the heel-seat-forming devices. Fig. 2 illustrates a slight modification showing the adjustable bed and the pressure as obtained entirely by a pressure-block carried by the cross-head. Fig. 3 shows, in addition to the heel-blank-feeding devices, devices for feeding rands or other sections of a heel, and it also represents means for applying cement or paste to the rands or other sections of a heel as they are fed, and also a compressing device which is similar to that shown in Fig. 1, with the exception that the bed is operated by a lever and cam upon a cam-shaft instead of by the cam-lever and eccentric. Fig. 4 is a vertical section across the machine, a part of the middle of the machine being broken out to further illustrate the features of the invention. Fig. 5 is also a horizontal section taken immediately above the templet-plate, and showing in plan the parts immediately below said line. Fig. 6 is a vertical section of a slight modification in construction, which is hereinafter described. Fig. 7 is a view showing a detached rand and a heel-blank over it. Fig. 8 represents the two parts as secured together by pasting and gluing and compression. Fig. 9 is a view representing the rand-feeding devices upon a lower level in relation to the heel-holding pocket than in Fig. 3. Fig. 10 is a view in perspective of an uncompressed heel-blank. Fig. 11 shows it provided with a heel-seat. Fig. 12 shows the heel made in two sections and having a heel-seat. Figs. 13 and 14 show the rand-feeding devices on a lower level in relation to the pocket from that shown in Fig. 3. Fig. 15 is a view, part in horizontal section and part in plan, to show the position of the transferrer while the heel-blank is being compressed. Fig. 16 is a section showing a heel-blank with a compressed or molded heel-seat. Fig. 17 shows a heel-blank provided with a rand. Fig. 18 shows a heel-blank made in two sections. Fig. 19 shows a heel-blank having an intermediate tapering lift or rand. Fig. 20 is a view in perspective of the rand-feeding plate. Fig. 21 is a detail view of part of the pressure-block, showing engagement with a heel-blank in dotted lines.

A represents the cross-head of the machine. $a$ is the templet-plate; $a'$, the nail-carrier plate; $a^2$, the last or work-support; $a^3$, the jack-post; $a^4$, the toggle-head.

B is a box for holding heel-blanks in stack.

$b$ is a carrier for moving or transferring blanks one by one to the pocket or blank-holding receptacle $b'$, which is in many respects like that described in the said patent-application, in that it acts to receive a blank and to hold it until it is moved therefrom by the heel-blank carrier C over the yielding diaphragm $c$ to a position to be engaged by the latch or holding device $c'$, where it is held until it is again moved forward upon another movement of the heel-blank carrier to a position beneath the templet or over the heel end of a boot or shoe.

It is while the heel-blank is held in the pocket or recess that its seat is formed or shaped. I accomplish this result by making the pocket or recess a press, and the surface upon which the blank rests forms the bed $b^2$. The bed supports the removable former $b^3$, which has the shape which it is desired to give the seat of the heel. This bed may simply hold the heel-blank while it receives pressure from the block D, attached to the cross-head A of the machine, which is moved vertically upon it, or it may have an upward compressing movement given it by means of a head or slide $b^4$, operated from below by an eccentric $b^5$ on the shaft $b^6$, and a cam-lever $b^7$, pivoted at $b^8$ and having a cam-groove $b^9$, which receives the cam-pin $b^{10}$, attached to the slide-head $b^4$. When this mechanism is employed, the pressure-block D, attached to the cross-head, may be used, in which case the bed is moved upward to force the heel-blank against the under surface of the pressure-block while it is in its lowest position; but I prefer to employ the stationary head or plate $b^{11}$, as shown in Fig. 6, as an abutment or support against which the heel-blank is compressed, as it enables the bed to be moved more slowly and a more powerful cam to be employed, and at the same time relieves the cross-head from strain. In this connection I would say that by connecting the cam-lever $b^7$ with a cam $b^{12}$ on the cam-shaft $b^{13}$, or on a shaft geared to make one revolution for every four reciprocations of the cross-head, the pressure may be still further increased and longer continued. This construction is employed when it is desired to obtain a deep cavity or recess, or when very large and solid heels are used. When rands are used with the heel-blanks, it is not necessary to form so deep a cavity or seat in the heel, and oftentimes none at all, in which case the devices are used in simply compressing the heel-blank upon the rand.

The rand-feed is organized to feed previously formed or shaped rands, and they are held in stack in the box E and are movable from the bottom of the stack one by one by the carrier $e$, which transfers them to the pocket $b'$ and in position over the former $b^3$. The time of this movement is such that the rand is fed into position after the return movement of the heel-blank carrier C, but before a heel-blank is fed into the pocket or upon the bed.

The rand may be prepared for attachment to the heel-blank either by having a surface covered with glue, paste, or cement which has been allowed to dry, in order that they may be piled in stack in the box, and then passed under a roll E', moistened with water only, or paste, or any other suitable device for causing the glue or cement to become adhesive as it is fed, or they may be fed from stack and provided with a layer or coating of glue, cement, or paste on their passage to the bed; and this construction I have shown, $e'$ being a trough arranged to hold paste or cement, $e^2$ being a delivery-roll arranged to take the paste, glue, or cement from the trough and deliver it to an intermediate roll $e^3$, which in turn transfers it to the rand-roll E', which is arranged over the passage through which the rand is fed to the bed, and so as to cover its upper surface with glue as it is fed forward. The rand and heel-blank are then submitted to pressure by the downward movement of the block attached to the cross-head thereon, or by the upward movement of the bed, or by both, and this so firmly unites the rand to the blank that it can be fed forward from the pocket by the heel-blank feed with no danger of its becoming detached in its passage to the heel.

To center the heel-blank and rand on the bed, the block D may have centering-arms $d$, which have inclined surfaces $d'$, and which are adapted to extend downward against the back of the heel-blank and move it forward toward the face of the carrier; or the rand-carrier block may be used for this purpose, in which case it becomes stationary at the end of the feed movement and until the heel-blank is fed into the pocket.

The heel-blank-feeding block $b$, preferably, is operated by the nail-carrier-plate cam and connecting devices, as described in said application.

The heel-blank-carrier plate for transferring the heel-blank from the pocket $b'$ or bed to the attaching devices is operated substantially as therein described—namely, by a cam and rock-shaft. The rand-feeding device or carrier $e$ is operated by the nail-carrier-plate cam and connecting devices, in this case comprising a rock-shaft, one end of which is connected with the cam and the other end with a link $e^4$, connecting it with the carrier $e$.

In operation, if a rand is not used, the heel-blank is fed from its stack by the heel-blank carrier to a position in the pocket over the bed, where it remains until the next reciprocation of the cross-head, when it is submitted to great pressure between the block D, carried by the cross-head, and the bed $b^2$, or between the bed and plate or abutment $b^{11}$. It is held in this pocket or recess during two reciprocations of the cross-head, and is either twice submitted to a compressing action or to a long compression, according to the means employed. The use of an abutment $b^{11}$ and bed $b^2$, operated by a cam, provides for a long and continuous compression, while the employment of the head D gives two short periods of compression or blows. The forward blank is then advanced by the transferrer C to a position over the yielding diaphragm, from whence it is again advanced after another blank has been fed into the pocket and compressed to a position to be compressed upon and attached to the soles of a boot or shoe by the attaching devices. If a rand is used, it is fed from its stack to the bed $b^2$ before the heel-blank is fed from its stack, so as to be in a position beneath the heel-blank before the compression is applied, and the rand-transferrer is provided with a movement sufficient to bring the front edge or breast of the rand against the surface $g$, so that it centers it before the heel-blank is fed into place. The heel-blank is then fed, and the rand, which has been provided with an adhesive coating, is solidly united to the heel-blank by the downward movement of the cross-head, which submits them both to as great pressure as may be desired. Of course the bed $b^2$ is provided with means whereby it may be adjusted, and in the drawings I have shown this adjustment in Fig. 2 as obtained by the screw $g'$ and nut $g^2$, and in Fig. 3 by the intermediate adjusting-nut $g^2$, interposed between the slide-head and the bed and receiving a screw-spindle which extends from the bed. The head D upon the cross-head may be arranged to yield slightly, and when it is so constructed I obtain this result by means of a very powerful resisting spring or device $g^3$, (see Fig. 2,) placed between it and its support, and of sufficient power to hold the block rigid during the ordinary working of the machine. The preparation of the heel-blank for attachment in this way is very desirable, especially for the finer grades of work or where well-rounded lasts or work-supports are used, and a heel-blank thus formed is fed to the nailing devices, which comprise, essentially, a gang of awls, a gang of drivers, top-lift applying and spanking devices, and a breasting device similar to those described in said application and operated in a similar manner. Of course it will be understood that the movements of the heel-blank, its compression, and the feeding and attachment of the heel-blank are continuous automatic movements.

I would say that in lieu of feeding rands from the stack E top lifts may be fed therefrom to the heel-blank, in which case the carrier $e$ will be operated to deliver the top lift after the carrier $b$ had delivered the heel-blank to the bed $b^2$, and the pasting or cementing device will then be arranged to coat the under surface of the top lift as it is fed, or the upper surface of the heel-blank. This use of the invention, however, is desirable only for flush nailing, and it is then of advantage because it provides the heel-blank before it is fed with an accurately-cut lift, which enables the heel-blank to be accurately centered upon the soles of the boot or shoe and in relation to the templet by the heel-blank-transferring devices. This portion of the invention may also be utilized in making a composite heel or heel in two or more sections or parts, one of which sections shall be fed from the front stack B and another section or sections from the back stack E, and these two or more sections are united together in the pocket $b'$ by pressure and glue or cement or other adhesive substance. This enables me to make and deliver a heel-blank one part of which shall be of cheaper or inferior stock, and it also enables me to make a heel-blank which the transferring device can readily seize and center, because the upper section of the blank or other part of the blank which is seized by the grasping-arm of the transferring device can be cut to a regular or very nearly regular shape, and may consist of two or more lifts of the same size having a straight edge or parallel edges. When the heel-blank is thus made up in sections, it will be desirable to use the form of heel-press shown in Fig. 3, in order that the extent of movement of the bed may be varied, to have a longer throw when the first section of the blank is fed to form the seat in it before the other section is fed and then to have a shorter throw to unite the two sections. The abutment or head D may be slightly curved to favor the action of the former $b^3$, and when so made the upper surface of the blank is brought to a level by the flat surface of the templet and during the compression of the heel-blank by the heel-blank-attaching devices.

The device can also be used for feeding heel-blanks in sections to the attaching devices, as in nailing ogee heels, which as a rule require two nailings, and in this event the various transferring devices would be timed by the operating-cams, so that one section of the heel-blank would be first fed from one stack and delivered to the attaching devices and attached, and then the other section from the other stack. When the heel is blind-nailed, I prefer to employ the top-lift-feeding devices arranged in relation to the templet and last or work-support substantially as described in my said application. It is desirable that heel-blanks which are to be used without rands, and which are provided with heel-seats, should be made thicker at the back than at the breast, and this result is obtained, preferably, by inserting in the heel-blank a skived lift skived from its back end forward, as this increases the thickness of the heel at the back. (See Fig. 19, where $m$ is the skived lift.) If desired, the heel-blanks may be slightly tempered before they are fed to the compressing devices. This construction insures in substance a very accurate feeding of the heel-blank to the soles of the boot or shoe. The former $b^3$ is of substantially the same shape as the heel end of the last, and the heel-blank after it has been subjected to the compression which solidifies it and forms the heel-seat is immediately transferred to the heel-attaching devices before it has had time to set or change its shape, and is then united under very great compression to the sole of the boot or shoe, so that the compression exerted in attaching the heel-blank supplements the first forming compression, and the heel-blank is attached while it is under the full effect or influence of the first forming action, and before it has become warped or checked, and the first forming action is had with especial reference to the particular boot or shoe to which the blank is to be immediately secured, and to the form of the heel end of the last or work-support. This secures a completeness of result which is impossible to obtain by any other method.

The heel-attaching devices are the same, preferably, as those described in said application—that is, they comprise a head 1, adapted to be automatically rotated and having an arm 2, which supports a block carrying a gang or group of awls 3, an arm 4, supporting a block carrying a gang or group of drivers 5, an arm 6, and an arm 7, carrying the breasting apparatus 8. The top-lift supplying or feeding devices are similar to those therein described, and comprise a box or receptacle 9, from which top lifts are fed in successive order by the carrier 10 to the top-lift transferrer 11, by which they are fed in successive order to a position beneath the templet $a$.

It is obvious that the heel-blank-compressing devices can be used without the devices for feeding the heel-blank and rand, or either, thereto; but for ordinary purposes I prefer to provide the press with this automatic heel-blank-feeding attachment or device. I would further say that when a rand is employed the heel-blank need not be so solidly compressed as when it is not, and when it is desired simply to unite the rand to the heel-blank, or two sections of the heel-blank together, the pressure may be so regulated as not to compress the heel-blank materially.

In operation the boot or shoe is placed upon the work-support and moved under the templet, and upon starting the machine a formed heel-blank previously made and fed is attached by the heel-blank-attaching devices to the sole of the boot or shoe and at the same time a heel-blank or rand-blank or two sections of the heel are fed to the heel-press and pressed thereby and the heel-seat formed, and the transferrer is operated to move a heel-blank from the press toward the heel-attaching devices. If the heel is to be blind-nailed, a top lift is also fed automatically into position over the attached heel-blank and secured thereto.

Having thus fully described my invention, I claim and desire to secure by Letters Patent of the United States—

1. In an organized heel attaching and compressing machine, the combination of heel-attaching devices comprising a gang of awls, a gang of drivers, a templet, and a heel-support with a heel-press and devices, substantially as specified, for causing the simultaneous operation of the press and of the heel-attaching mechanism, substantially as described.

2. In a heel-nailing machine, the combination of heel-attaching devices, a bed and movable head, substantially as described, for compressing the heel-blank, and a carrier for transferring the compressed heel-blank from the bed to the heel-attaching devices, substantially as described.

3. The combination, in a heel-attaching machine, of heel-attaching devices, a heel-blank holder or pocket $a'$, a bed and a head, substantially as described, movable in relation to the pocket to compress a heel-blank therein, and a transferrer for moving the compressed heel-blank from the pocket or bed to the heel-attaching devices, substantially as described.

4. The combination, in a heel-nailing machine, of the heel-attaching devices, a heel-compressing bed, a head, and a pocket or device, substantially as described, for holding the heel-blank between the bed and head, and a heel-blank-feeding plate or carrier for feeding the heel-blank to the heel-holding pocket or device, and a carrier for transferring the heel-blank from the bed or pocket to the heel-attaching devices, substantially as described.

5. The combination, in a heel-nailing machine, of heel-attaching devices, a bed and a head, substantially as described, between which a heel-blank is adapted to be compressed, a box for holding heel-blanks in stack, a heel-blank-carrying plate for moving the heel-blanks from the box or stack to a position between the bed and the head, and a transferrer for moving the compressed heel-blank from the bed to the heel-attaching devices, substantially as described.

6. In a heel-attaching machine, the combination of heel-nailing devices, a receptacle for holding heel-blanks in stack or quantity, heel-blank-transferring mechanism for transferring the blanks from the receptacle to the attaching devices, and a heel-blank press, substantially as described, between the said receptacle and the said heel-blank-attaching devices to form or mold the heel-blanks in successive order upon their passage to the attaching devices, substantially as described.

7. The combination of the heel-blank-attaching devices, the heel-blank carrier C, the pocket or receptacle $b'$, the bed $b^2$, a heel-blank press adapted to compress heel-blanks in said pocket, the box B, and the heel-blank carrier $b$, substantially as described.

8. The combination of the pocket or receptacle $b'$, the heel-blank press, substantially as described, the box or receptacle B, and the heel-blank carrier $b$, substantially as described.

9. The combination of the bed and head of a heel-blank press, substantially as described, with the heel-blank receptacle B and the heel-blank carrier $b$, for carrying blanks from the receptacle to a position in the heel-blank press, substantially as described.

10. The combination, in a heel-nailing machine, of heel-attaching devices, a heel-press, a box or receptacle for holding rands, and a carrier for feeding rands therefrom to the press, a box or receptacle for holding blanks, and a heel-blank carrier for feeding the heel-blanks therefrom to the press, substantially as described.

11. The combination, in a heel-nailing machine, of heel-attaching devices, a heel-press, a box or receptacle for holding rands, and a carrier for feeding rands therefrom to the press, a box or receptacle for holding blanks, a heel-blank carrier for feeding the heel-blanks therefrom to the press, and a heel-blank transferrer for carrying the heel-blank and rand from the press to the heel-attaching devices, substantially as described.

12. The combination of the bed and head of the heel-blank press, substantially as described, with the carrier $e$ and the carrier $b$, substantially as described.

13. In a heel-press, the head D, having the heel-blank-centering device $d'$, substantially as described.

14. The combination, in a heel attaching and molding machine, of a bed or table having the pocket $b'$, provided with a straight vertical surface against which the rand or section of a heel-blank is adapted to be pressed, with the carrying device $e$, as described, shaped to center the rand or section of the heel against said straight surface, substantially as described.

15. The combination of the bed $b^2$, the slide-head $b^4$, and the cam-lever $b^7$, pivoted at $b^8$, having a cam-groove $b^9$, which receives a cam-pin $b^{10}$ upon the slide-head, substantially as described.

16. The combination of the pocket $b'$, the bed $b^2$, the slide-head $b^4$, and the adjusting-nut adjustably connecting the bed with the slide-head, substantially as described.

17. The combination of the rand or heel-section carrier plate $e$ with the paste or glue applying device for applying glue or paste to its upper surface as it is fed or moved by the carrier-plate, substantially as described.

18. In a heeling-machine, the combination of a feedway through which a rand or heel-section is adapted to be fed, with an apparatus for applying a solution or liquid to the upper surface of said rand or heel-section—such as a roll, the operating-surface of which extends into said feedway from above it—as and for the purposes described.

19. In a heel-nailing machine, the combination of the tank $e'$ with the rolls $e^2$ $e^3$ $E'$, substantially as described.

20. In a heeling-machine, the combination of a rand or heel-section carrier, a pocket or receptacle to which the rands or heel-sections are fed, an apparatus for applying glue or paste to the upper surface of the rand or heel-section—such as a roll—a second carrier for feeding a heel-blank or other heel-section to the said pocket or receptacle, and a heel-press to compress said rand and heel or said sections of the heel together in said pocket, and a heel transferrer or carrier to transfer said compressed heel-blank to the nail-driving devices, and the nail-driving devices, substantially as described.

21. The combination of a carrier for feeding rands or heel-sections to a pocket or receptacle, a paste or glue applying apparatus located to feed paste or glue to the upper surface of the rand or heel-section as it is moved by the carrier, a second carrier for feeding a heel-blank or additional heel-section to said pocket or receptacle, a heel-press to compress said sections in said pocket, a heel-blank transferrer or carrier to transfer said compressed heel-blank from the heel-press to the nail-driving devices, a paste or glue applying apparatus arranged between said heel-press and said nail-driving devices to deliver paste or glue to the said heel-blank, and the nail-driving devices, substantially as described.

22. The combination of the box or receptacle E, the carrier $e$, the paste, glue, or liquid applying apparatus $E'$, the box or receptacle B, the carrier $b$, the receptacle or pocket $b'$, and a heel-press the bed of which forms the under surface of the said receptacle or pocket, substantially as described.

23. The combination of the box or receptacle E, the carrier $e$, the paste, glue, or liquid applying apparatus $E'$, the box or receptacle B, the carrier $b$, the receptacle or pocket $b'$, a heel-press the bed of which forms the under surface of the said receptacle or pocket, the heel-blank transferrer C, and the nail-driving devices, substantially as described.

24. The combination, in a heel-attaching machine, of a heel-press comprising a bed and head, one of which has a yielding movement in relation to the other, with a transferrer C, for carrying the compressed heel-blank from the press to the heel-attaching devices, and said heel-attaching devices, substantially as described.

25. The combination, in an organized heel-attaching machine, of a heel-press, heel-attaching devices, the main shaft of the machine, and levers and cams in connection with the main shaft, whereby the heel-press and heel-attaching devices are simultaneously operated upon separate or independent heels, substantially as described.

26. The combination, in a heel-attaching machine, of a heel-press, the heel-attaching devices, the main shaft of the machine, and connecting mechanism, substantially as specified, and a heel-blank transferrer for carrying the compressed heel-blank to the heel-attaching devices, whereby the heel-blank is compressed simultaneously with the attachment of another compressed heel-blank, and a transferrer actuated to move a compressed heel-blank into position for attachment to the next boot or shoe to be heeled, substantially as described.

27. The herein-described method of forming and attaching heels, consisting in simultaneously and automatically feeding two or more sections of a heel-blank to a predetermined point, applying an adhesive substance to a part of said sections, uniting them by pressure, automatically transferring the completed heel to an attaching device, and finally securing the heel to the sole, as set forth.

FREEBORN F. RAYMOND, 2D.

Witnesses:
J. M. DOLAN,
FRED. B. DOLAN.